United States Patent
Muto

(10) Patent No.: US 12,372,372 B2
(45) Date of Patent: Jul. 29, 2025

(54) MAP DATA GENERATION DEVICE, IN-VEHICLE EQUIPMENT, AND MAP DATA GENERATION METHOD

(71) Applicant: DENSO CORPORATION, Kariya (JP)

(72) Inventor: Shigehiro Muto, Kariya (JP)

(73) Assignee: DENSO CORPORATION, Kariya (JP)

( * ) Notice: Subject to any disclaimer, the term of this patent is extended or adjusted under 35 U.S.C. 154(b) by 218 days.

(21) Appl. No.: 17/356,358

(22) Filed: Jun. 23, 2021

(65) Prior Publication Data

US 2021/0318138 A1 Oct. 14, 2021

Related U.S. Application Data

(63) Continuation of application No. PCT/JP2019/047208, filed on Dec. 3, 2019.

(30) Foreign Application Priority Data

Dec. 25, 2018 (JP) .................. 2018-241072

(51) Int. Cl.
*G01C 21/00* (2006.01)
*B60W 10/20* (2006.01)
*B60W 30/10* (2006.01)
*G01C 21/26* (2006.01)

(52) U.S. Cl.
CPC ......... *G01C 21/3819* (2020.08); *B60W 10/20* (2013.01); *B60W 30/10* (2013.01); *G01C 21/26* (2013.01)

(58) Field of Classification Search
CPC ....... B60W 10/20; B60W 30/10; G01C 21/26; G01C 21/3819; G01C 21/38; G01C 21/3804; G09B 9/003; G09B 29/106; G05D 1/0061; G05D 1/0088; G05D 1/021; G05D 1/0214; G05D 1/0221; G05D 1/0223

See application file for complete search history.

(56) References Cited

U.S. PATENT DOCUMENTS

| 10,417,906 | B2 * | 9/2019 | Fowe ..................... G08G 1/065 |
| 2016/0098496 | A1 | 4/2016 | Joshi et al. |
| 2016/0216122 | A1 * | 7/2016 | Borgerson ............. G01C 21/26 |

(Continued)

FOREIGN PATENT DOCUMENTS

| JP | 2010-026875 A | 2/2010 |
| JP | 2015-161518 A | 9/2015 |

(Continued)

*Primary Examiner* — Christian Chace
*Assistant Examiner* — Nicholas Stryker
(74) *Attorney, Agent, or Firm* — Maschoff Brennan

(57) ABSTRACT

A map data generation device includes a start section setting unit configured to set a start section in a first lane, an end section setting unit configured to set an end section in a second lane, a first storage control unit configured to cause crossing travel track data from the start section to the end section to be stored in a crossing travel track data storage unit, a travelable range data generating unit configured to generate travelable range data indicating a travelable range when a vehicle travels using an automated driving function or a driving assist function using the crossing travel track data, and a second storage control unit configured to cause the travelable range data to be stored in a travelable range data storage unit.

11 Claims, 17 Drawing Sheets

(56) References Cited

U.S. PATENT DOCUMENTS

| 2017/0016731 | A1 | 1/2017 | Koshiba et al. | |
| 2017/0313320 | A1* | 11/2017 | Asakura | B60R 25/1012 |
| 2017/0314957 | A1* | 11/2017 | Mimura | G01C 21/3697 |
| 2018/0345963 | A1* | 12/2018 | Maura | B60W 60/0011 |
| 2019/0310091 | A1* | 10/2019 | Maeda | G01C 21/30 |

FOREIGN PATENT DOCUMENTS

| JP | 2017-097088 A | 6/2017 |
| JP | 2018-181035 A | 11/2018 |

\* cited by examiner

MAP DATA GENERATION DEVICE, IN-VEHICLE EQUIPMENT, AND MAP DATA GENERATION METHOD

CROSS-REFERENCE TO RELATED APPLICATION

This application is the U.S. bypass application of International Application No. PCT/JP2019/047208 filed on Dec. 3, 2019 which designated the U.S. and claims priority to Japanese Patent Application No. 2018-241072 filed on Dec. 25, 2018, the contents of both of which are incorporated herein by reference.

TECHNICAL FIELD

The present disclosure relates to a map data generation device, in-vehicle equipment, and a map data generation method.

BACKGROUND

A method has been used in related art which measures a shape and a position of a road with high accuracy using a dedicated moving vehicle and generates map data indicating a track on which a vehicle can travel. This method requires expensive sensors and a huge amount of work by humans in principle and can only generate map data in limited sections such as expressways and limited highways. Thus, this method cannot generate map data in sections such as general roads.

SUMMARY

According to one aspect of the present disclosure, a start section setting unit sets a start section in a first lane, the start section is a section in which a vehicle can start moving a lane when the vehicle travels across the lane from the first lane to a second lane. An end section setting unit sets an end section in a second lane, the end section is a section in which a vehicle can end moving a lane when the vehicle travels across the lane from the first lane to the second lane. A first storage control unit causes crossing travel track data from the start section to the end section to be stored in a crossing travel track data storage unit. A travelable range data generating unit generates travelable range data indicating a travelable range when a vehicle travels using an automated driving function or a driving assist function, using the crossing travel track data. A second storage control unit causes the travelable range data to be stored in a travelable range data storage unit.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
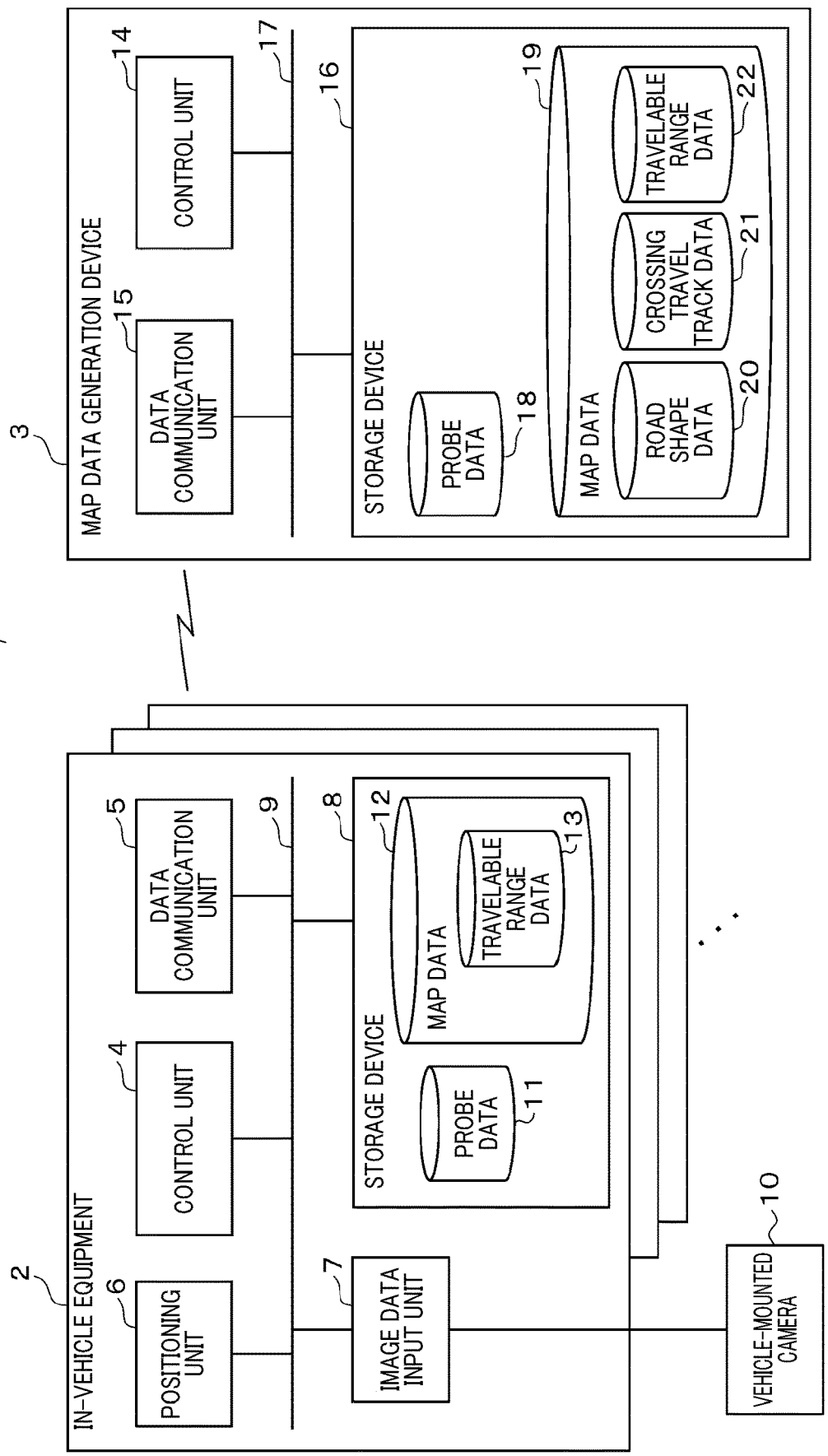
FIG. 1 is a functional block diagram illustrating an overall configuration of an embodiment.

For example, JP 2017-97088 A discloses a method of generating map data by inferring a new road using a GPS track indicating a global positioning system (GPS) position of a vehicle as an absolute track and estimating connection between the inferred new road and an existing road. For example, JP 2015-184459 A discloses a method of acquiring a travel track from a GPS track and sensor information and generating a new road by matching the acquired travel track to a road shape. For example, JP 2010-26875 A discloses a method of generating map data inside an intersection by connecting an entry-side lane on an entry to the intersection and an exit-side lane on a side of exit from the intersection with an arc (quadratic Bezier curve). For example, JP 2016-75905 A discloses a method of generating map data inside an intersection by tracking a travel track and extracting a result of traveling from a specific lane to another specific lane.

Map data generated using the above-described methods disclosed in the patent documents mentioned above is data in which a shape of a section where lanes cross such as, for example, a merging section and a branch section is expressed with an approximate curve using a mathematical expression. Thus, this map data can be utilized as connection information indicating connection between lanes, but cannot be utilized as information when a vehicle travels using an automated driving function or a driving assist function. In other words, in a case where a vehicle travels using the automated driving function or the driving assist function, the vehicle needs to travel while detecting a situation around the vehicle and avoiding collision with other vehicles, or the like, which are traveling or which stops around the vehicle, and cannot avoid collision by only traveling in accordance with the map data simply indicating connection between lanes. From such circumstances, a technique of generating map data which can be utilized as information when a vehicle travels, using an automated driving function or a driving assist function in a section where lanes cross, is desired.

The present disclosure is directed to appropriately generating map data which can be used when a vehicle travels using an automated driving function or a driving assist function in a section where lanes are crossed.

According to one aspect of the present disclosure, a start section setting unit sets a start section in a first lane, the start section is a section in which a vehicle can start moving a lane when the vehicle travels across the lane from the first lane to a second lane. An end section setting unit sets an end section in a second lane, the end section is a section in which a vehicle can end moving a lane when the vehicle travels across the lane from the first lane to the second lane. A first storage control unit causes crossing travel track data from the start section to the end section to be stored in a crossing travel track data storage unit. A travelable range data generating unit generates travelable range data indicating a travelable range when a vehicle travels using an automated driving function or a driving assist function, using the crossing travel track data. A second storage control unit causes the travelable range data to be stored in a travelable range data storage unit.

The travelable range data indicating the travelable range when the vehicle travels using the automated driving function or the driving assist function is generated using the crossing travel track data from the start section to the end section. Unlike with methods in related art which generate map data simply indicating connection between lanes, the travelable range data is generated using the crossing travel track data, so that it is possible to appropriately generate map data which can be utilized when the vehicle travels using the automated driving function or the driving assist function in a section where lanes cross.

According to an aspect of the present disclosure, a travelable range data acquiring unit acquires travelable range data indicating a travelable range when a vehicle travels using an automated driving function or a driving assist function, from a map data generation device. A vehicle behavior data generating unit generates vehicle behavior data indicating vehicle behavior relating to the automated driving function and the driving assist function within the travelable range. A peripheral situation acquiring unit acquires a condition around a vehicle. An implementation determining unit determines whether it is possible to implement the vehicle behavior indicated by the vehicle behavior data using the situation around the vehicle. A vehicle behavior implementing unit implements the vehicle behavior in a case where it is determined that it is possible to implement the vehicle behavior.

The travelable range data indicating the travelable range when the vehicle travels using the automated driving function or the driving assist function is acquired from the map data generation device, whether it is possible to implement the vehicle behavior within the travelable range is determined using the situation around the vehicle, and the vehicle behavior is implemented in a case where it is determined that it is possible to implement the vehicle behavior. By implementing the vehicle behavior relating to the automated driving function and the driving assist function in accordance with the situation around the vehicle, it is possible to appropriately implement the automated driving function and the driving assist function.

An embodiment will be described below with reference to the drawings. As illustrated in FIG. 1, a map data generation system 1 includes in-vehicle equipment 2 mounted on a vehicle side and a map data generation device 3 provided on a network side, which can perform data communication with each other via a communication network. One map data generation device 3 is provided for a plurality of pieces of the in-vehicle equipment 2, and the map data generation device 3 can perform data communication with a plurality of pieces of in-vehicle equipment 2.

The in-vehicle equipment 2 includes a control unit 4, a data communication unit 5, a positioning unit 6, an image data input unit 7, and a storage device 8, and respective functional blocks can perform data communication via an internal bus 9. The control unit 4 includes a microcomputer including a central processing unit (CPU), a read only memory (ROM), a random access memory (RAM) and an input/output (I/O). The control unit 4 executes a computer program stored in a non-transitory tangible storage medium to thereby execute processing corresponding to the computer program and controls the overall operation of the in-vehicle equipment 2. The computer program to be executed by the control unit 4 includes a map data utilization program.

The data communication unit 5 controls data communication with the map data generation device 3. The positioning unit 6 includes a global positioning system (GPS) receiver, an acceleration sensor, a geomagnetic sensor, or the like, measures a current position of the in-vehicle equipment 2, and outputs positioning data indicating the measured current position and positioning time to the control unit 4. A vehicle-mounted camera 10, which is provided separately from the in-vehicle equipment 2, captures an image ahead of the vehicle and outputs the captured image data to the in-vehicle equipment 2. In a case where the image data input unit 7 receives the image data from the vehicle-mounted camera 10, the image data input unit 7 outputs the input image data to the control unit 4.

The storage device 8 includes a probe data storage unit 11 which stores probe data and a map data storage unit 12 which stores map data. The map data storage unit 12 includes a travelable range data storage unit 13 which stores travelable range data which will be described later. The travelable range data is data indicating a travelable range when the vehicle travels using an automated driving function or a driving assist function.

The control unit 4 associates the positioning data input from the positioning unit 6 with the image data input from the image data input unit 7 and causes probe data including the positioning data and the image data which are associated with each other to be regularly stored in the probe data storage unit 11. The control unit 4 reads the probe data from the probe data storage unit 11, for example, every time a predetermined period has elapsed or every time a travel distance has reached a predetermined distance and causes the readout probe data to be transmitted from the data communication unit 5 to the map data generation device 3.

Figure 2:
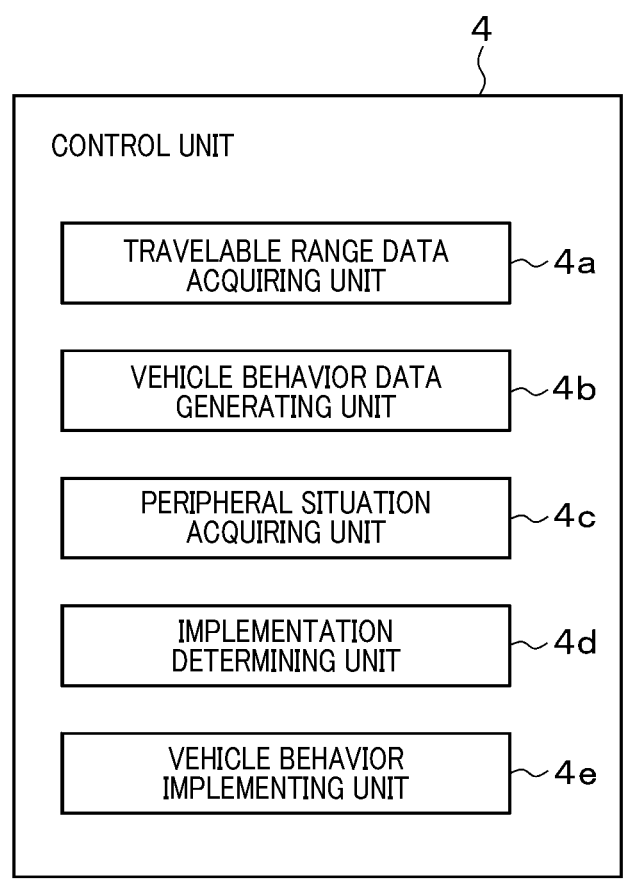
FIG. 2 is a functional block diagram of a control unit of in-vehicle equipment.

As illustrated in FIG. 2, the control unit 4 includes a travelable range data acquiring unit 4a, a vehicle behavior data generating unit 4b, a peripheral situation acquiring unit 4c, an implementation determining unit 4d, and a vehicle behavior implementing unit 4e. These functional blocks correspond to processing of the map data utilization program to be executed by the microcomputer.

The travelable range data acquiring unit 4a acquires the travelable range data from the map data generation device 3 by receiving the travelable range data transmitted from the map data generation device 3 at the data communication unit 5. When the travelable range data is acquired by the travelable range data acquiring unit 4a, the vehicle behavior data generating unit 4b generates vehicle behavior data indicating vehicle behavior relating to the automated driving function and the driving assist function within the travelable range. In other words, the vehicle behavior data generating unit 4b generates predicted track data indicating a predicted track within the travelable range and vehicle control data indicating vehicle control as the vehicle behavior data.

The peripheral situation acquiring unit 4c acquires information indicating whether there is a vehicle, or the like, which is traveling or which stops around the vehicle as a circumstance around the vehicle. When the circumstance around the vehicle is acquired by the peripheral situation acquiring unit 4c, the implementation determining unit 4d determines whether the vehicle behavior indicated by the vehicle behavior data generated by the vehicle behavior data generating unit 4b can be implemented using the acquired situation around the vehicle.

In a case where it is determined by the implementation determining unit 4d that the vehicle behavior can be implemented, for example, because there is no vehicle, or the like, which is traveling or which is stopped nearby the vehicle, and there is no risk of collision, the vehicle behavior implementing unit 4e implements the vehicle behavior. In other words, the vehicle behavior implementing unit 4e implements travel control in accordance with the predicted track indicated by the predicted track data and the vehicle control indicated by the vehicle control data. Meanwhile, in a case where it is determined by the implementation determining unit 4d that the vehicle behavior cannot be implemented, for example, because there is a vehicle, or the like, which is traveling or which stops around the vehicle, and there is a possibility of collision, the vehicle behavior implementing unit 4e does not implement the vehicle behavior. In other words, the vehicle behavior implementing unit 4e does not implement travel control in accordance with the predicted track indicated by the predicted track data and the vehicle control indicated by the vehicle control data.

The map data generation device 3 includes a control unit 14, a data communication unit 15, and a storage device 16, and respective functional blocks can perform data communication via an internal bus 16. The control unit 14 includes a microcomputer including a CPU, a ROM, a RAM, and an I/O. The control unit 14 executes a computer program stored in a non-transitory tangible storage medium to thereby execute processing corresponding to the computer program and controls the overall operation of the map data generation device 3. The computer program to be executed by the control unit 14 includes a map data generation program.

The data communication unit 15 controls data communication with the in-vehicle equipment 2. The storage device 16 includes a probe data storage unit 18 which stores probe data, and a map data storage unit 19 which stores map data. When probe data transmitted from the in-vehicle equipment 2 is received by the data communication unit 15, the control unit 14 causes the received probe data to be stored in the probe data storage unit 18. In other words, one map data generation device 3 is provided for a plurality of pieces of in-vehicle equipment 2, and thus, when a plurality of pieces of probe data transmitted from the plurality of pieces of in-vehicle equipment 2 is received by the data communication unit 15, the control unit 14 causes the received plurality of pieces of probe data to be stored in the probe data storage unit 18.

The map data storage unit 19 includes a road shape data storage unit 20 which stores road shape data, a crossing travel track data storage unit 21 which stores crossing travel track data, and a travelable range data storage unit 22 which stores travelable range data. When the crossing travel track data is generated as will be described later, the control unit 14 causes the generated crossing travel track data to be stored in the crossing travel track data storage unit 21. Further, when first travel track data and second travel track data are specified using the crossing travel track data and the travelable range data is generated using the specified first travel track data and second travel track data, the control unit 14 causes the generated travelable range data to be stored in the travelable range data storage unit 22. Still further, the control unit 14 reads the travelable range data stored in the travelable range data storage unit 22 and causes the travelable range data to be distributed from the data communication unit 15 to the in-vehicle equipment 2.

Figure 3:
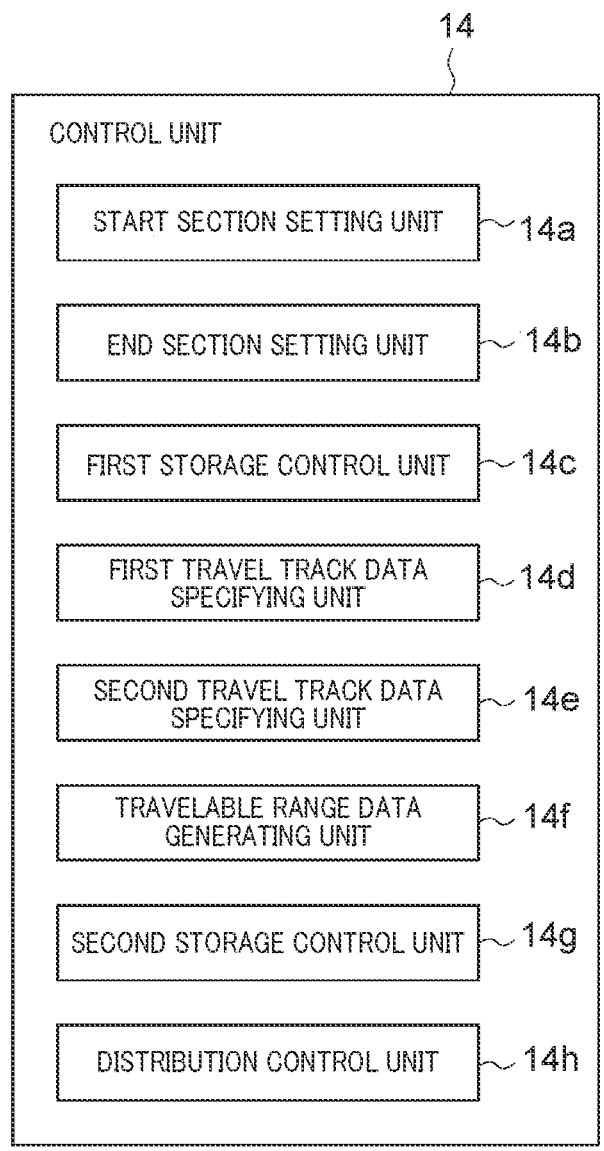
FIG. 3 is a functional block diagram of a control unit of a map data generation device.

As illustrated in FIG. 3, the control unit 14 includes a start section setting unit 14a, an end section setting unit 14b, a first storage control unit 14c, a first travel track data specifying unit 14d, a second travel track data specifying unit 14e, a travelable range data generating unit 14f, a second storage control unit 14g, and a distribution control unit 14h. These functional blocks correspond to processing of the map data generation program to be executed by the microcomputer.

The start section setting unit 14a sets a start section of a first lane using road shape data. The first lane is a lane before lanes intersect when a vehicle travels across lanes. The start section is a section in which the vehicle can start moving a lane when the vehicle travels across lanes. The end section setting unit 14b sets an end section of a second lane using road shape data. The second lane is a finish lane after the vehicle complete traveling across lanes. The end section is a section in which the vehicle can finish moving a lane when the vehicle travels across lanes.

The first storage control unit 14c causes travel track data specified by the probe data from the start section to the end section among the probe data stored in the probe data storage unit 18 to be stored in the crossing travel track data storage unit 21 as the crossing travel track data.

The first travel track data specifying unit 14d specifies crossing travel track data that is closest to the endpoint on one side of the start section and away from the start section as the first travel track data. In other words, the first travel track data specifying unit 14d specifies crossing travel track data which separates from the start section earliest among a plurality of pieces of crossing travel track data when viewed on the same time axis as the first travel track data. The second travel track data specifying unit 14e specifies crossing travel track data that is closest to the endpoint on another side of the start section and away from the start section as the second travel track data. In other words, the second travel track data specifying unit 14e specifies crossing travel track data which separates from the start section latest among a plurality of pieces of crossing travel track data when viewed on the same time axis as the second travel track data.

Figure 4:
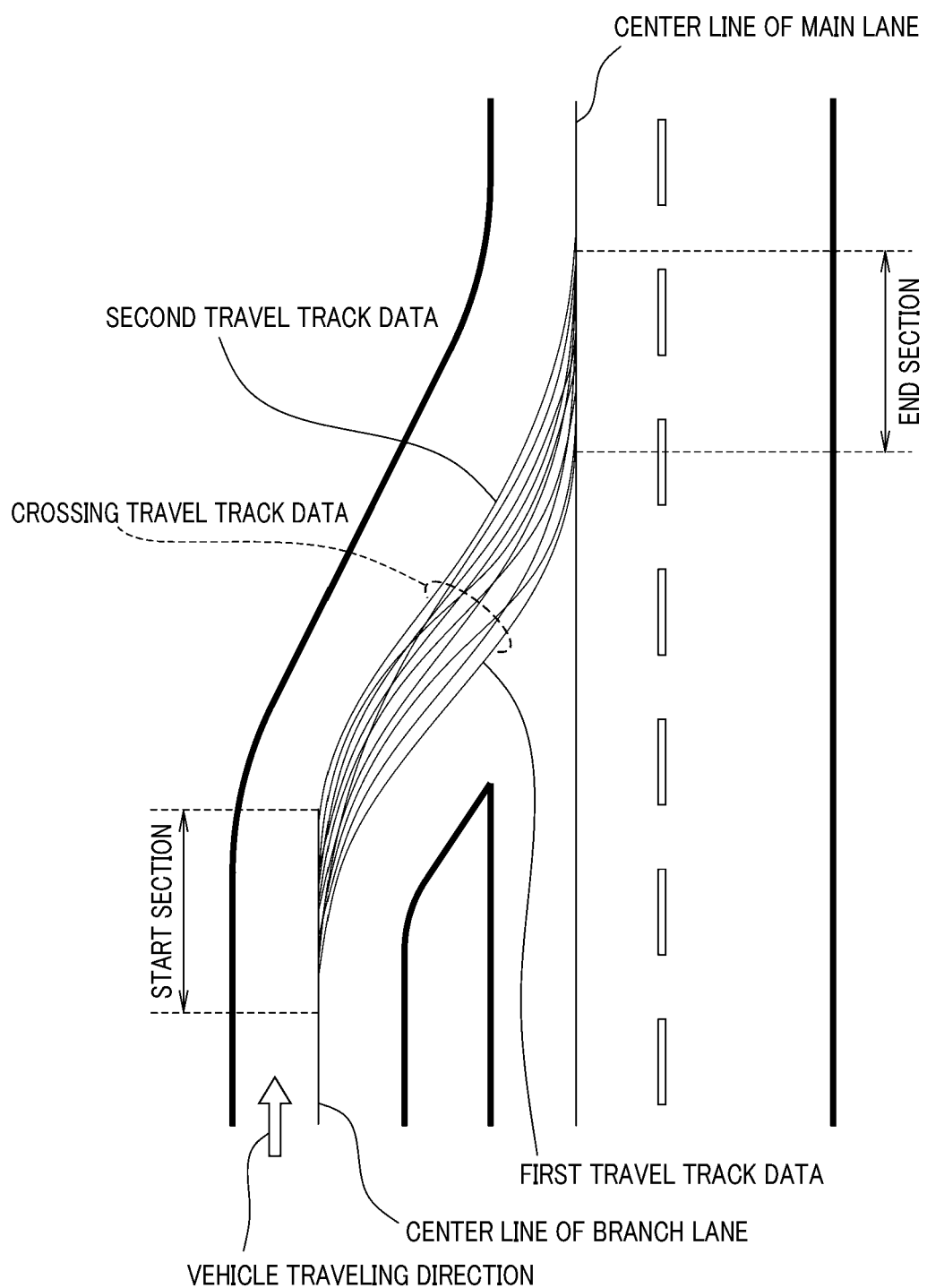
FIG. 4 is a view illustrating a start section, an end section, crossing travel track data, first travel track data, and second travel track data in a merging section.

The crossing travel track data, the first travel track data, the second travel track data will be specifically described. As illustrated in FIG. 4, in a merging section, a branch lane is the first lane, and a main lane is the second lane. In this case, among a plurality of pieces of crossing travel track data from the branch lane to the main lane, crossing travel track data which separates from a center line or an extended line of the branch lane earliest becomes the first travel track data, and crossing travel track data which separates latest becomes the second travel track data.

Figure 5:
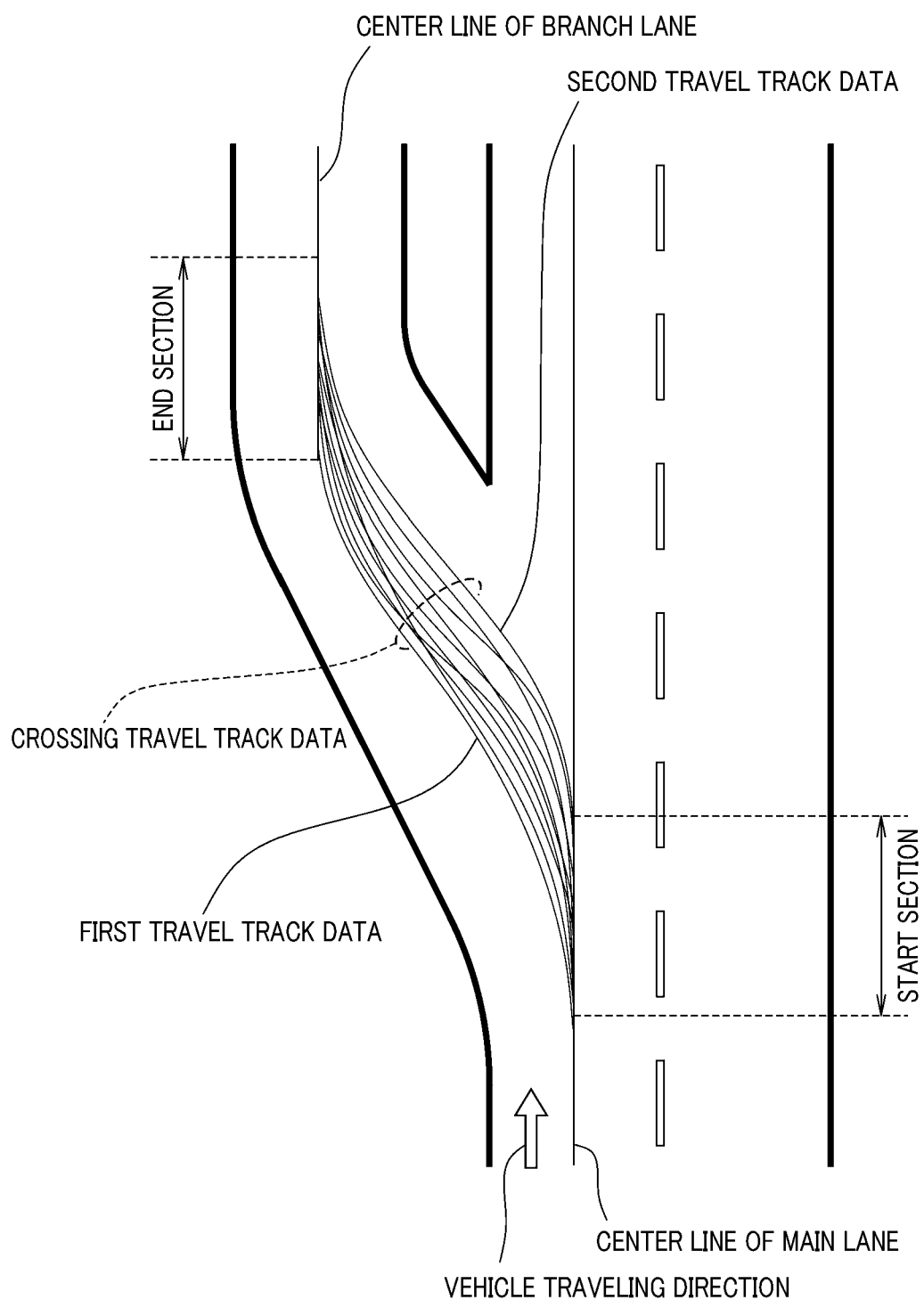
FIG. 5 is a view illustrating a start section, an end section, crossing travel track data, first travel track data, and second travel track data in a branch section.

Further, as illustrated in FIG. 5, in a branch section, a main lane is the first lane, and a branch lane is the second lane. In this case, among a plurality of pieces of crossing travel track data from the main lane to the branch lane, crossing travel track data which separates from a center line of the main lane earliest becomes the first travel track data, and crossing travel track data which separates latest becomes the second travel track data.

Figure 6:
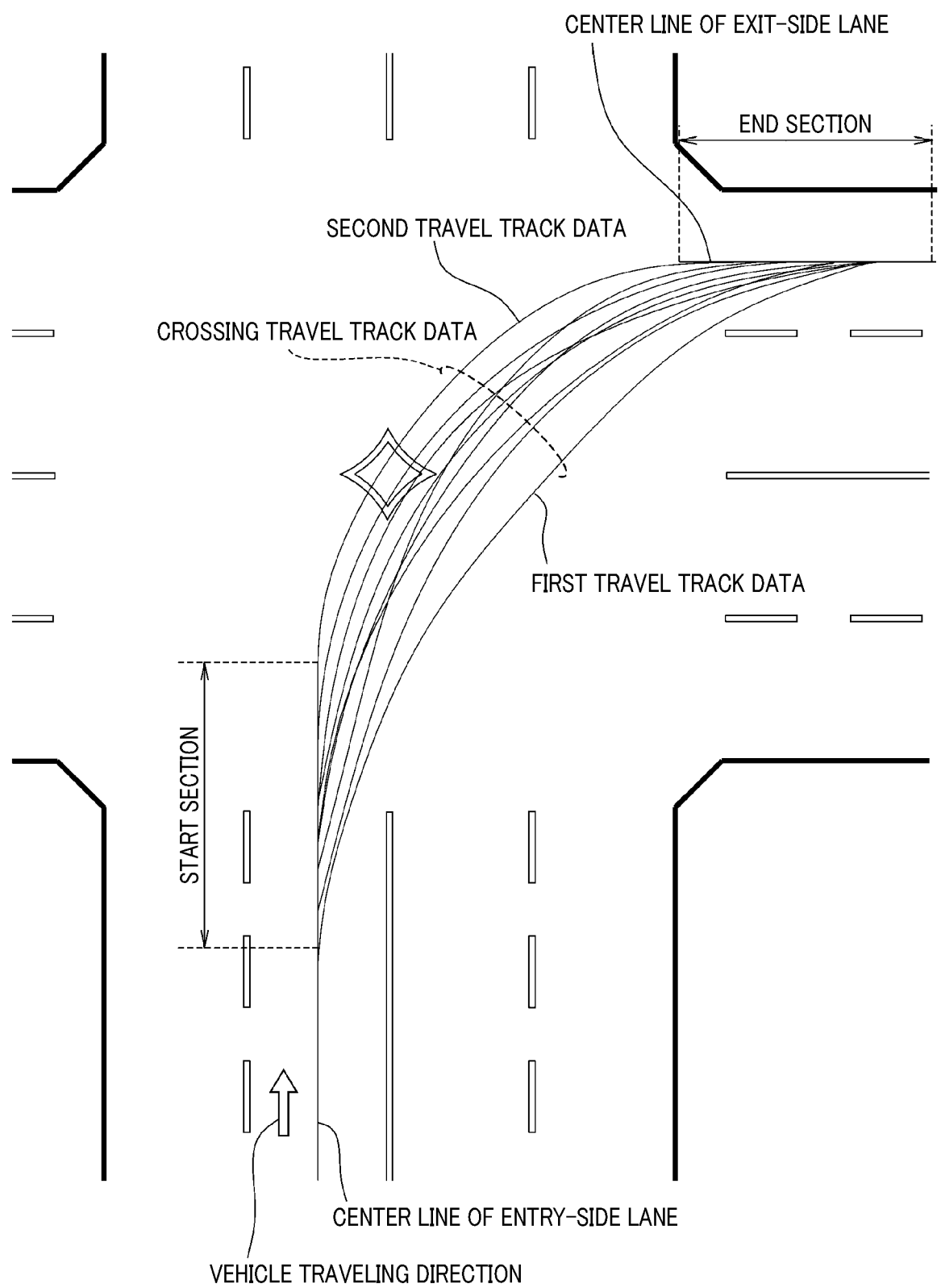
FIG. 6 is a view illustrating a start section, an end section, crossing travel track data, first travel track data, and second travel track data at an intersection.

Further, as illustrated in FIG. 6, at an intersection, an entry-side lane from which a vehicle enters the intersection is the first lane, and an exit-side lane to which the vehicle exits from the intersection is the second lane. In this case, among a plurality of pieces of crossing travel track data from the entry-side lane to the exit-side lane, crossing travel track data which separates from a center line or an extended line of the entry-side lane earliest becomes the first travel track data, and crossing travel track data which separates latest becomes the second travel track data.

Figure 7:
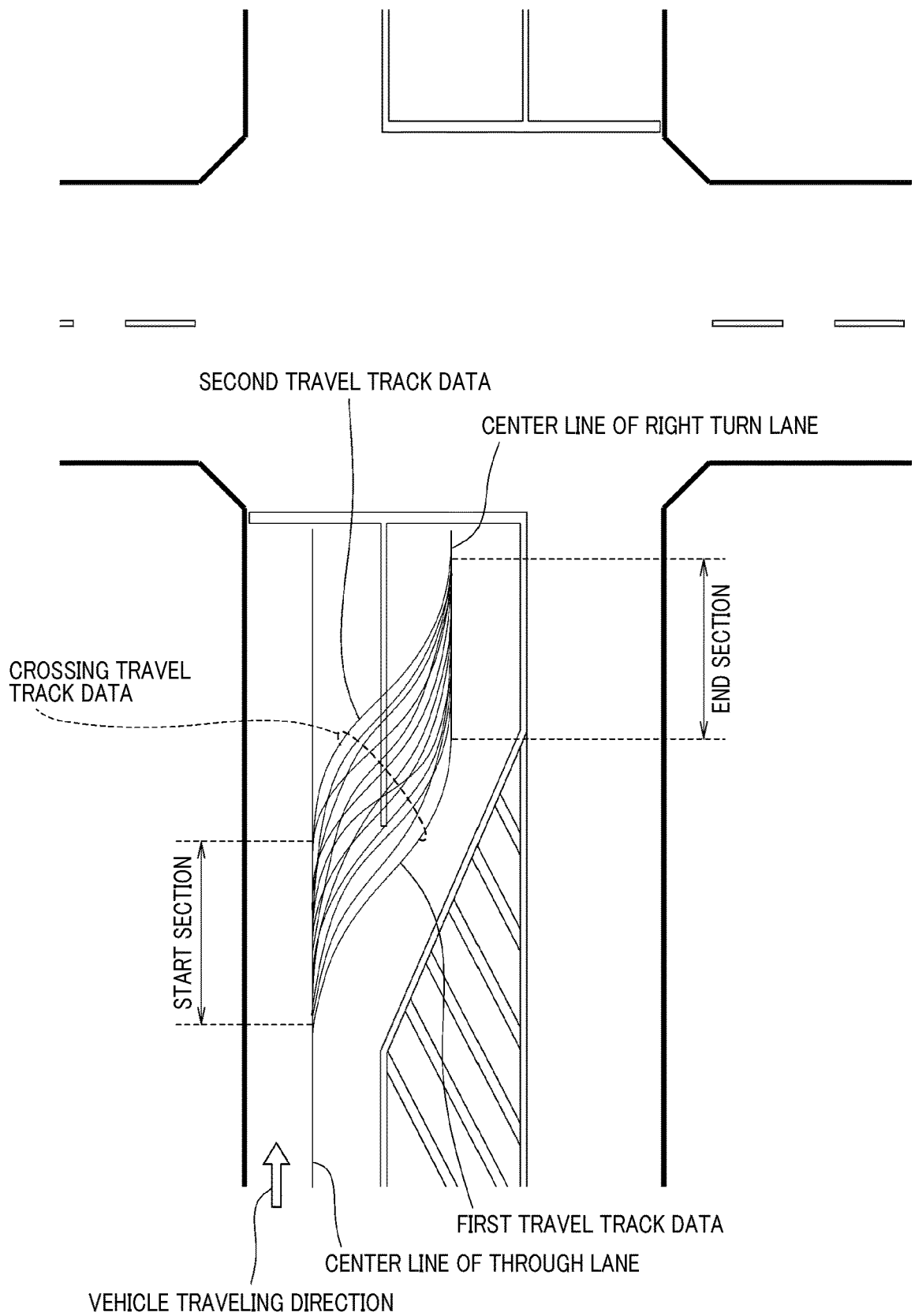
FIG. 7 is a view illustrating a start section, an end section, crossing travel track data, first travel track data, and second travel track data on an entry to an intersection.

Further, as illustrated in FIG. 7, on an entry to an intersection, a through lane among entry-side lanes from which the vehicle enters the intersection is the first lane, and a right turn lane is the second lane. In this case, among a plurality of pieces of crossing travel track data from the through lane to the right turn lane, crossing travel track data which separates from a center line of the through lane earliest becomes the first travel track data, and crossing travel track data which separates latest becomes the second travel track data.

Figure 8:
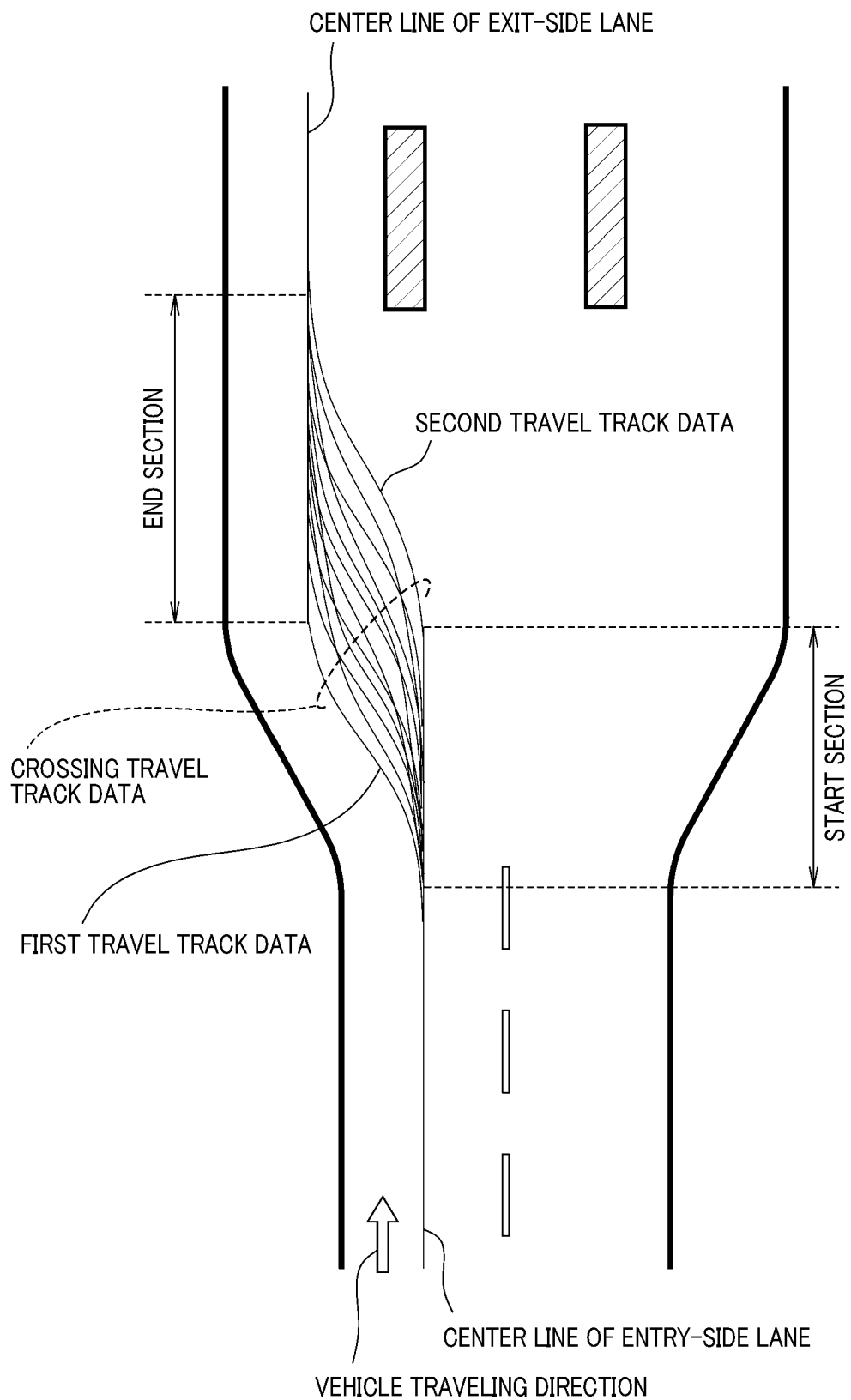
FIG. 8 is a view illustrating a start section, an end section, crossing travel track data, first travel track data, and second travel track data on an entry to a toll booth.
Figure 9:
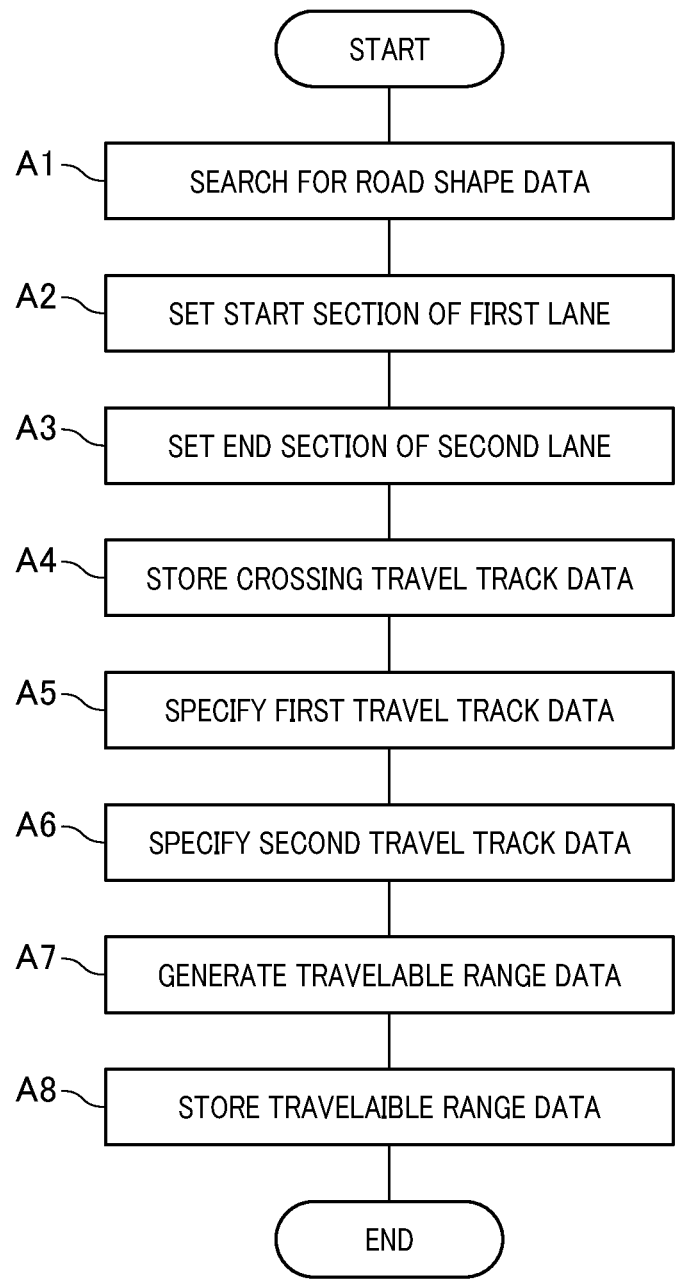
FIG. 9 is a flowchart illustrating processing of generating travelable range data.
Figure 10:
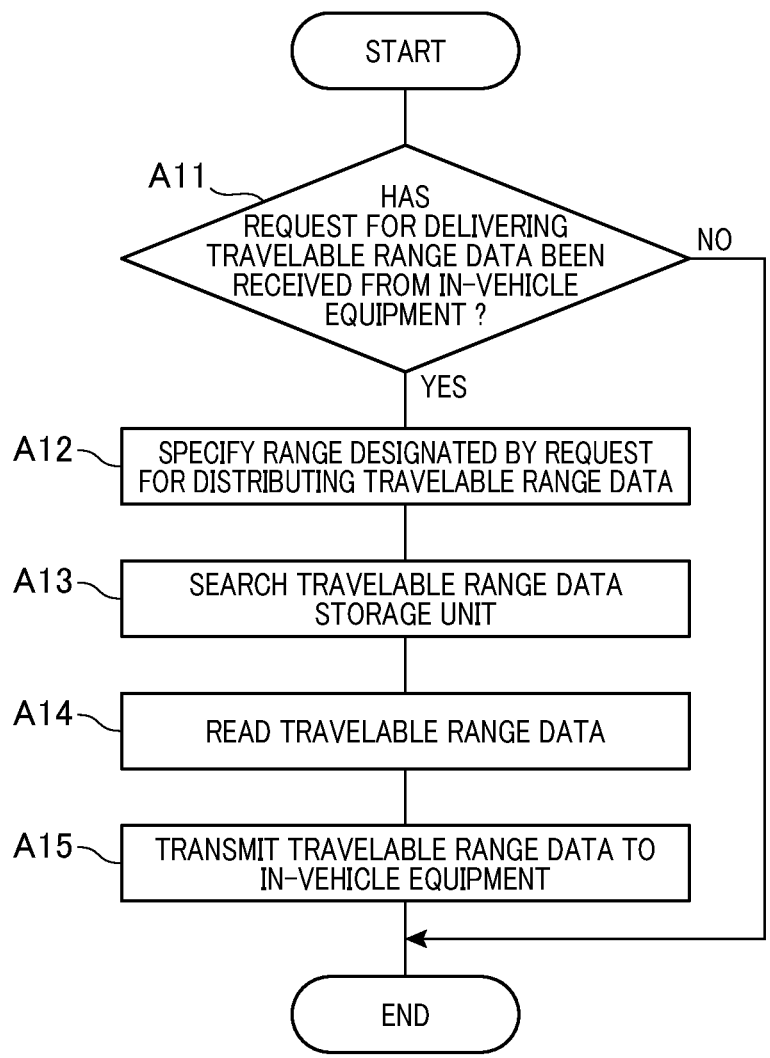
FIG. 10 is a flowchart illustrating processing of distributing travelable range data.
Figure 11:
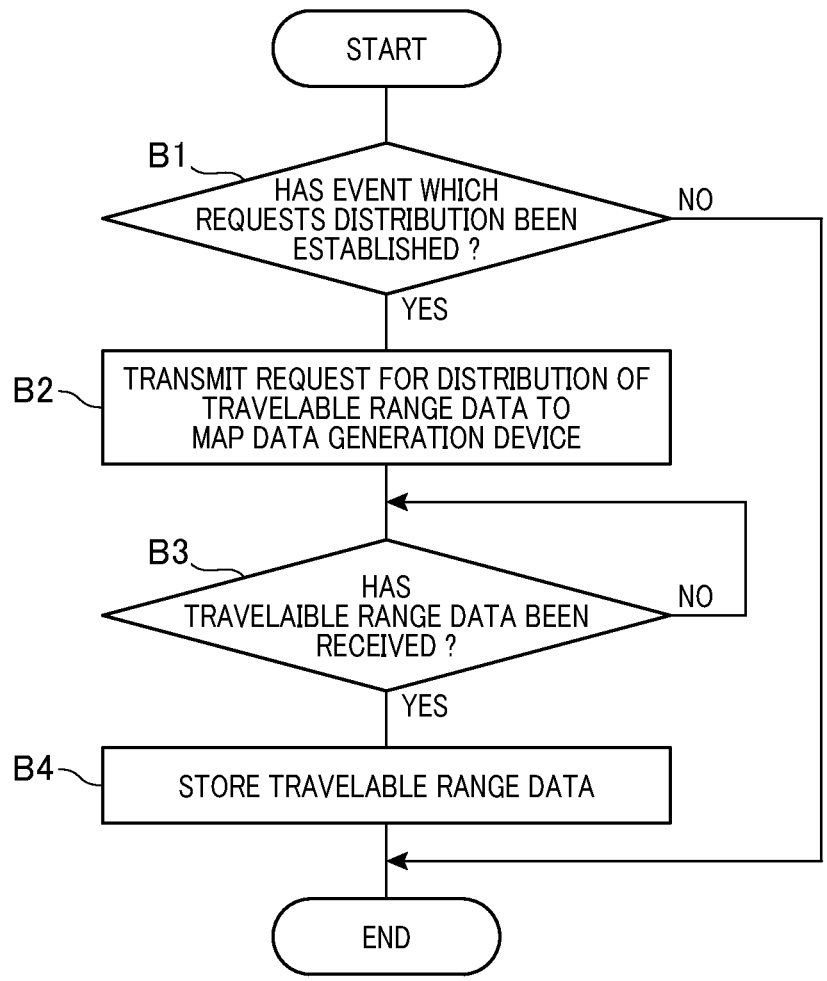
FIG. 11 is a flowchart illustrating processing of requesting distribution of travelable range data.
Figure 12:
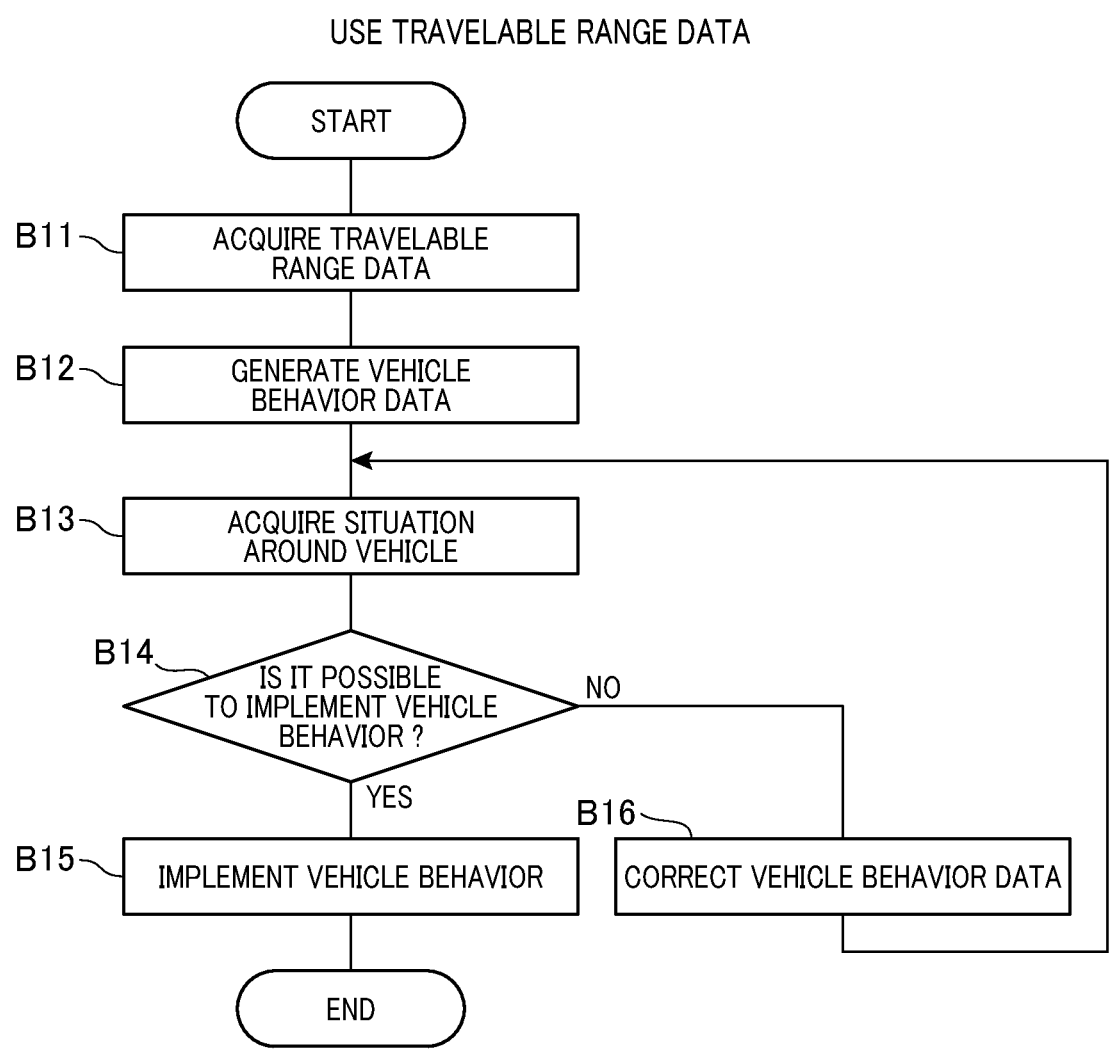
FIG. 12 is a flowchart illustrating utilization process of travelable range data.
Figure 13:
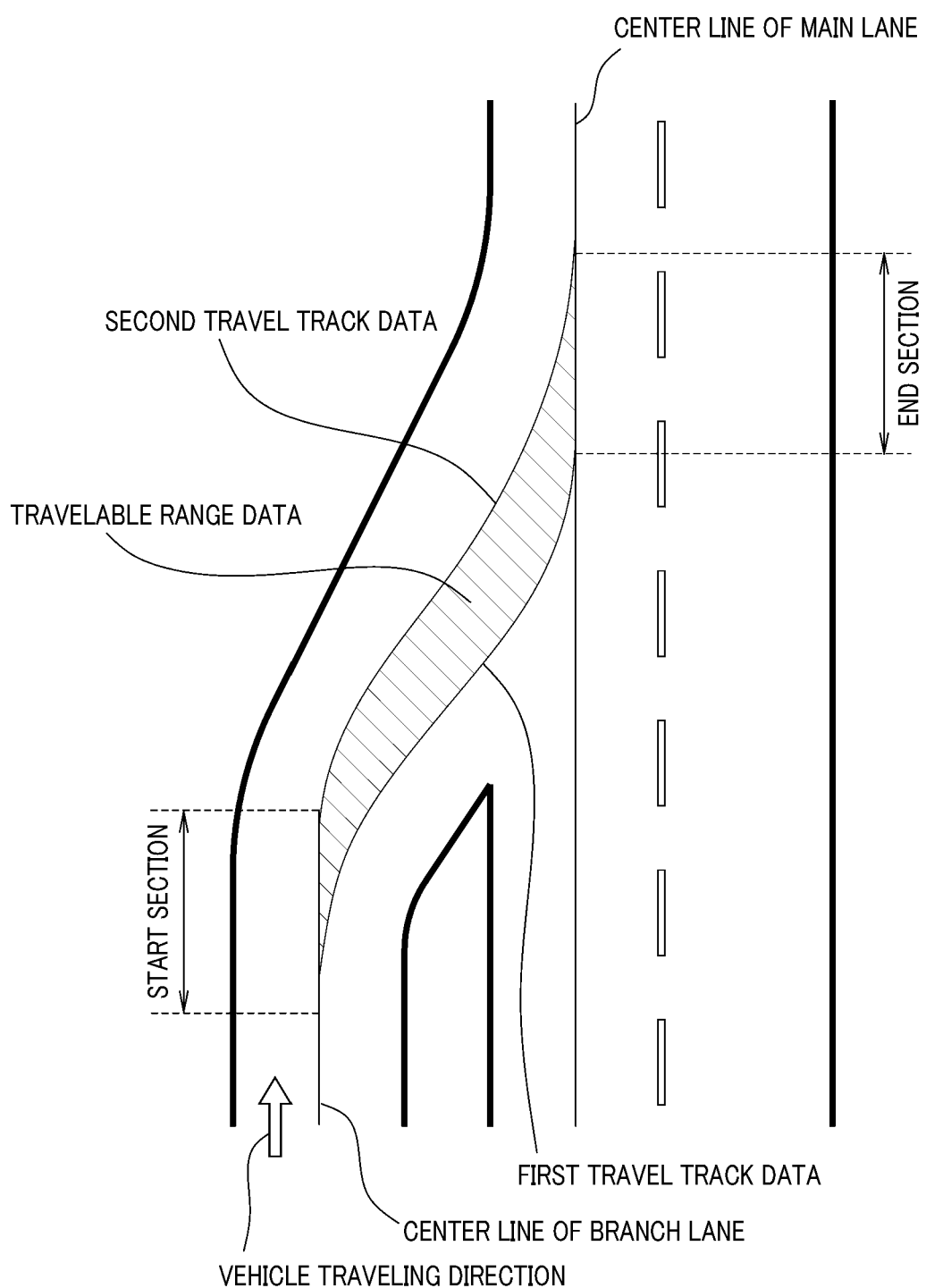
FIG. 13 is a view illustrating travelable range data in a merging section.
Figure 14:
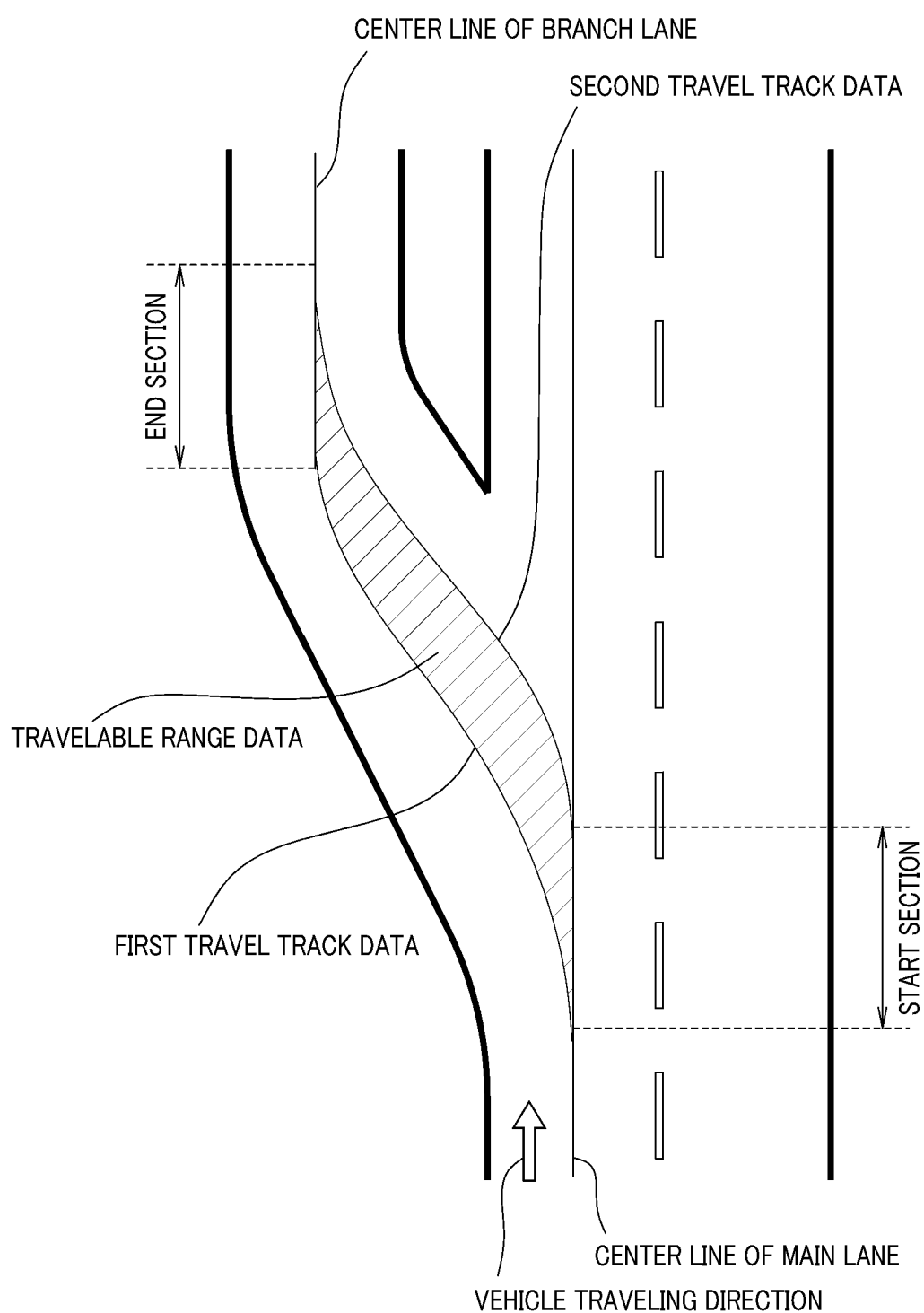
FIG. 14 is a view illustrating travelable range data in a branch section.
Figure 15:
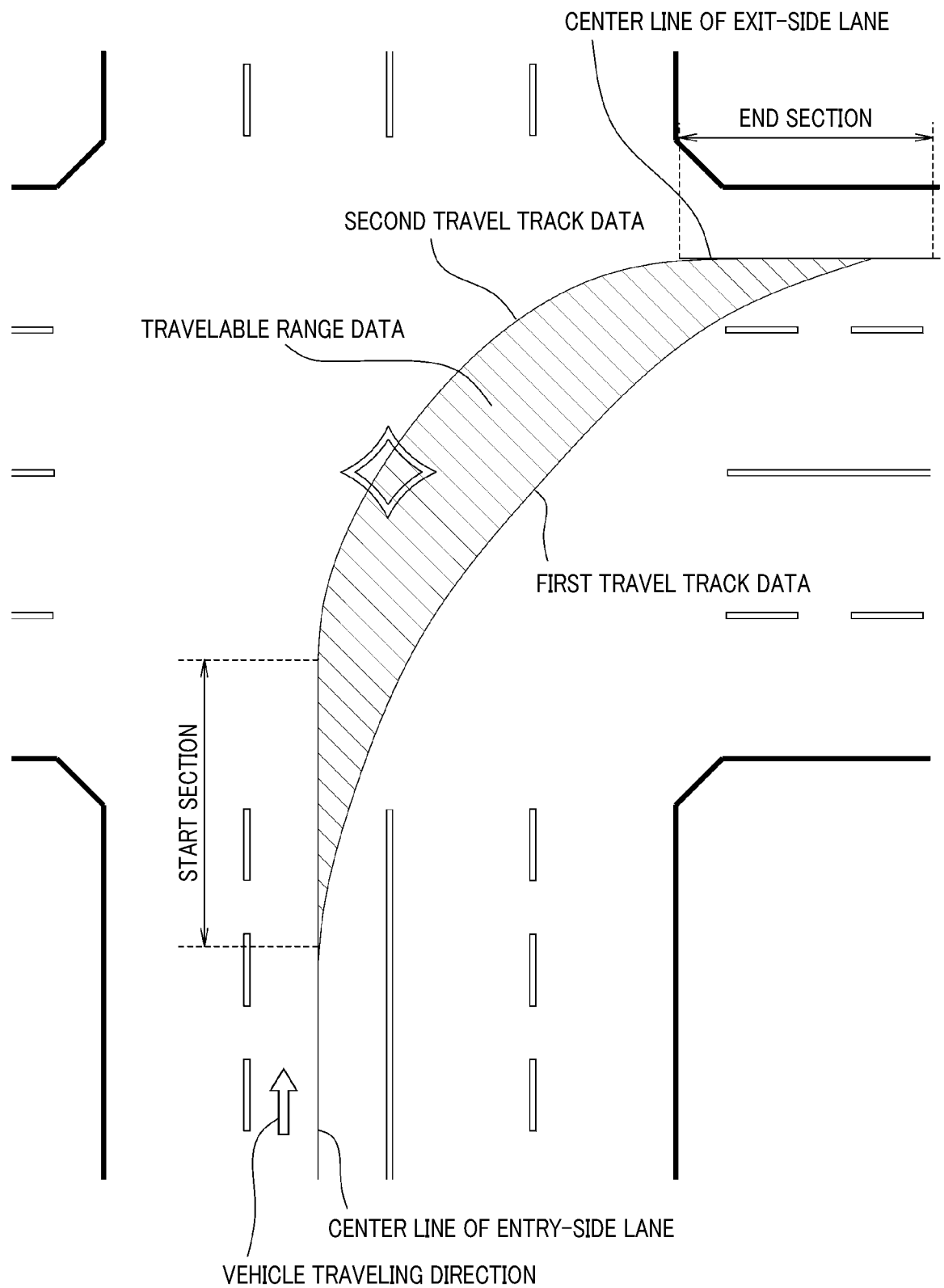
FIG. 15 is a view illustrating travelable range data at an intersection.
Figure 16:
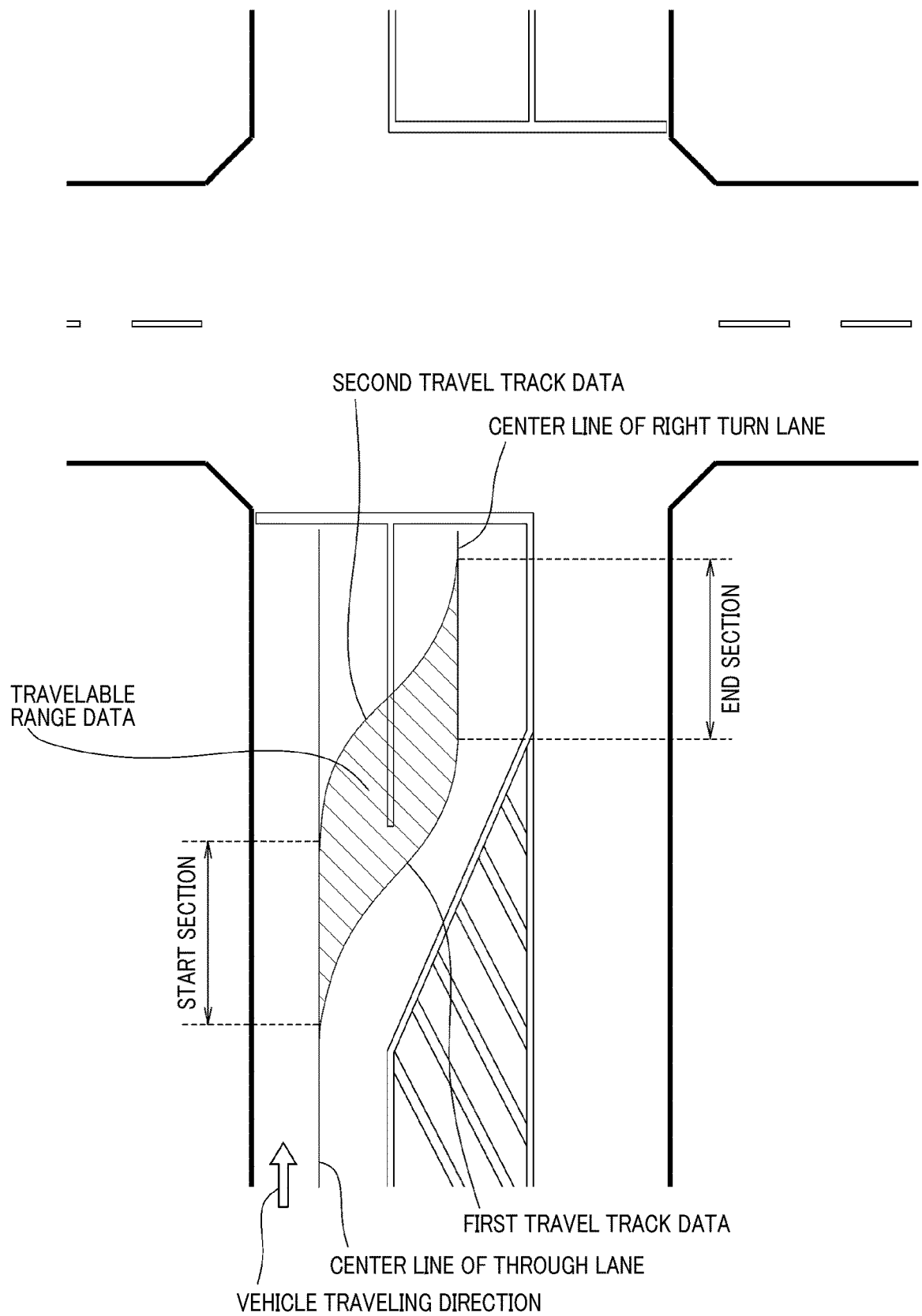
FIG. 16 is a view illustrating travelable range data on an entry to an intersection.
Figure 17:
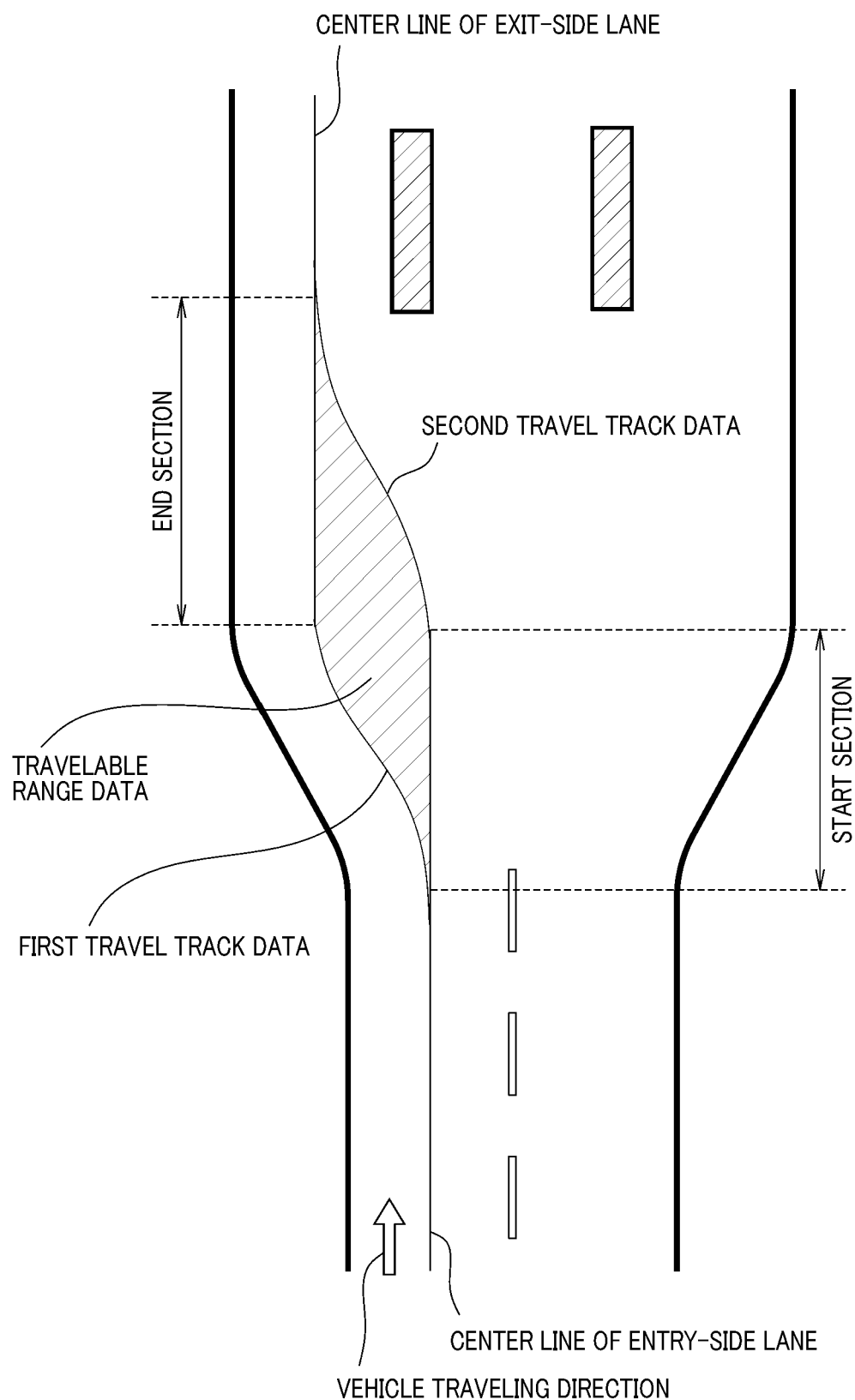
FIG. 17 is a view illustrating travelable range data of entry to a toll booth.

Further, as illustrated in FIG. 8, on an entry to a toll booth, an entry-side lane from which the vehicle enters the toll booth is the first lane, and an exit-side lane to which the vehicle exits from the toll booth is the second lane. In this case, among a plurality of pieces of crossing travel track data from the entry-side lane to the exit-side lane, crossing travel track data which separates from a center line or an extended line of the entry-side lane earliest becomes the first travel track data, and crossing travel track data which separates latest becomes the second travel track data. Note that while FIG. 8 illustrates an example of the crossing travel track data from the entry-side lane on a left side to the exit-side lane on a left side, the same will also apply to crossing travel track data from the entry-side lane on a left side to the exit-side lane at the center or to the exit-side lane on a right side and crossing travel track data from the entry-side lane on a right side to any exit-side lane.

The travelable range data generating unit 14*f* generates travelable range data in the form of polygon data using the first travel track data and the second travel track data. In this case, the travelable range data generating unit 14*f* may generate the travelable range data after excluding crossing travel track data which deviates from a predetermined range by performing statistical processing on the crossing travel track data. When the travelable range data is generated by the travelable range data generating unit 14*f*, the second storage control unit 14*g* causes the generated travelable range data to be stored in the travelable range data storage unit 22 after an attribute which can specify the travelable range data is provided. The distribution control unit 14*h* causes the travelable range data stored in the travelable range data storage unit 22 to be transmitted from the data communication unit 15 to the in-vehicle equipment 2.

Operation of the above-described configuration will be described next with reference to FIG. 9 to FIG. 17. Here, processing of generating the travelable range data and processing of distributing the travelable range data which are to be performed by the map data generation device 3, and processing of requesting distribution of the travelable range data and processing of utilizing the travelable range data which are to be performed by the in-vehicle equipment 2 will be described.

(1-1) Processing of Generating Travelable Range Data

At the map data generation device 3, when the processing of generating the travelable range data is started, the control unit 14 searches for the road shape data stored in the road shape data storage unit 20 (A1), sets the start section of the first lane (A2, start section setting procedure), and sets the end section of the second lane (A3, end section setting procedure). In other words, the control unit 14, for example, specifies a section where lanes cross such as the merging section and the branch section described above from the road shape data, sets a predetermined length on a center line of the lane before lanes intersect as a start section, and sets a predetermined length on a center line of the lane after lanes intersect as an end section. Note that the control unit 14 may set the start section of the first lane and the end section of the second lane by specifying a section in which crossing travel track data between lanes is concentrated as well as by searching for the road shape data. Further, the control unit 14 may make a length of the start section the same as or different from a length of the end section.

The control unit 14 causes travel track data specified by probe data corresponding to a section from the start section to the end section among the probe data stored in the probe data storage unit 18 to be stored in the crossing travel track data storage unit 21 as crossing travel track data (A4, first storage control procedure). The control unit 14 specifies crossing travel track data which separates from the start section at a position closest to an end point on one side of the start section among the crossing travel track data, that is, crossing travel track data which separates from the start section earliest among a plurality of pieces of crossing travel track data when viewed on the same time axis as the first travel track data (A5, first travel track data specification procedure). The control unit 14 specifies crossing travel track data which separates from the start section at a position closest to an end point on the other side of the start section among the crossing travel track data, that is, crossing travel track data which separates from the start section latest among a plurality of pieces of crossing travel track data when viewed on the same time axis as the second travel track data (A6, second travel track data specification procedure).

The control unit 14 generates travelable range data indicating a travelable range when the vehicle travels using the automated driving function or the driving assist function, using the first travel track data and the second travel track data (A7, travelable range data generation procedure). In other words, as illustrated in FIG. 13 to FIG. 17, the control unit 14 generates a range between the first travel track data and the second travel track data in the merging section, in the branch section, at the intersection, on an entry to the intersection, and on an entry to the toll booth as the travelable range data. After the control unit 14 generates the travelable range data in this manner, the control unit 14 causes the generated travelable range data to be stored in the travelable range data storage unit 22 (A8, second storage control procedure) and finishes the processing of generating the travelable range data.

(1-2) Processing of Distributing Travelable Range Data

At the map data generation device 3, when processing of distributing the travelable range data is started, the control unit 14 determines whether the data communication unit 15 receives a request for distributing the travelable range data from the in-vehicle equipment 2 (A11). In a case where the control unit 14 determines that the data communication unit 15 does not receive a request for distributing the travelable range data (A11: No), the control unit 14 finishes the processing of distributing the travelable range data.

In a case where the control unit 14 determines that the data communication unit 15 receives a request for distributing the travelable range data (A11: Yes), the control unit 14 specifies a range designated by the received request for distributing the travelable range data (A12), searches the travelable range data storage unit 22 (A13), and reads the travelable range data in the specified range (A14). For example, in a case where the specified range is a merging section, the control unit 14 reads travelable range in the merging section. In a case where the control unit 14 reads the travelable range data in the specified range, the control unit 14 causes the readout travelable range data to be transmitted from the data communication unit 15 to the in-vehicle equipment 2 (A15) and finishes the processing of distributing the travelable range data.

(2-1) Processing of Requesting Distribution of Travelable Range Data

At the in-vehicle equipment 2, when processing of requesting distribution of the travelable range data is started, the control unit 4 determines whether an event which requests distribution has occurred (B1). In a case where the control unit 4 determines that, for example, there is no section where lanes cross such as a merging section and a branch section in a vehicle traveling direction while the vehicle travels using the automated driving function or the driving assist function, and an event which requests distribution is not established (B1: No), the control unit 4 finishes the processing of requesting distribution of the travelable range data.

In a case where the control unit 4 determines that, for example, there is a section where lanes cross such as a merging section and a branch section in a vehicle traveling direction while the vehicle travels using the automated driving function or the driving assist function and an event which requests distribution has occurred (B1: Yes), the control unit 4 causes a request for distributing the travelable range data to be transmitted from the data communication unit 5 to the map data generation device 3 (B2) and waits for reception of the travelable range data from the map data generation device 3 (B3). In a case where the control unit 4 determines that the data communication unit 5 receives the travelable range data (B3: Yes), the control unit 4 causes the received travelable range data to be stored in the travelable range data storage unit 13 (B4) and finishes the processing of requesting distribution of the travelable range data.

(2-2) Processing of Utilizing Travelable Range Data

At the in-vehicle equipment 2, when processing of utilizing the travelable range data is started, the control unit 4 acquires the travelable range data by reading out the travelable range data stored in the travelable range data storage unit 13 (B11, travelable range data acquisition procedure). The control unit 4 generates vehicle behavior data indicating vehicle behavior relating to the automated driving function and the driving assist function using the acquired travelable range data (B12, vehicle behavior data generation procedure). In other words, the control unit 4, for example, calculates the shortest transfer path and optimal vehicle control in the travelable range indicated by the travelable range data.

The control unit 4 acquires a situation around the vehicle (B13, peripheral condition acquisition procedure) and determines whether the vehicle behavior indicated by the vehicle behavior data can be implemented using the acquired situation around the vehicle (B14, implementation determination procedure). In a case where the control unit 4 determines that the vehicle behavior can be implemented (B14: Yes), the control unit 4 implements the vehicle behavior (B15: vehicle behavior implementation procedure) and finishes the processing of utilizing the travelable range data. In a case where the control unit 4 determines that the vehicle behavior cannot be implemented (B14: No), the control unit 4 corrects the vehicle behavior data in accordance with the acquired situation around the vehicle (B16), returns to processing in step B13 described above, and repeats the processing in step B13 and subsequent step.

In other words, for example, in a case of the merging section, in a case where the control unit 4 determines that the vehicle can move from the branch lane to the main lane through the shortest transfer path because there is no vehicle, or the like, which cuts in front of the vehicle, and there is no risk of collision, the control unit 4 implements vehicle behavior which moves the vehicle from the branch lane to the main lane through the shortest transfer path. Meanwhile, in a case where the control unit 4 determines that the vehicle cannot move from the branch lane to the main lane through the shortest transfer path because there is a vehicle, or the like, which cuts in front of the vehicle, and there is a possibility of collision, the control unit 4 corrects the transfer path to avoid the collision (B16), returns to step B13 described above, and repeats the processing in B13 and subsequent step.

Note that while a case of the merging section has been described above as an example, the same will also apply to the branch section, the intersection, on the side of entry into the intersection and on the side of entry into the toll booth. For example, in a case of the branch section, the control unit 4 determines whether to implement vehicle behavior of moving from the main lane to the branch lane through the shortest transfer path in accordance with whether there is a vehicle, or the like, which cuts in front of the vehicle. For example, in a case of the intersection, the control unit 4 determines whether to implement vehicle behavior of moving from an entry-side lane to an exit-side lane through the shortest transfer path in accordance with whether there is a vehicle, or the like, which waits for right turn inside the intersection. For example, also in a case on the side of entry into the intersection, the control unit 4 determines whether to implement vehicle behavior of moving from the entry-side lane to the exit-side lane through the shortest transfer path in accordance with whether there is a vehicle, or the like, which waits for right turn inside the intersection. For example, also in a case on the side of entry into the toll booth, the control unit 4 determines whether to implement vehicle behavior of moving from the entry-side lane to the exit-side lane through the shortest transfer path in accordance with whether there is a vehicle, or the like, which waits for passing through a toll gate.

As described above, according to the present embodiment, it is possible to provide the following effects.

At the map data generation device 3, the travelable range data indicating the travelable range when the vehicle travels using the automated driving function or the driving assist function is generated using the crossing travel track data from the start section to the end section. Unlike with the device in related art which generates map data simply indicating connection between lanes, by generating the travelable range data using the crossing travel track data, it is possible to appropriately generate map data which can be utilized when the vehicle travels using the automated driving function or the driving assist function in a section where lanes cross.

Further, at the map data generation device 3, crossing travel track data that is closest to the endpoint on one side of the start section and away from the start section as the first travel track data, crossing travel track data that is closest to the endpoint on the other side of the start section and away from the start section as the second travel track data, and the travelable range data is generated using the first travel track data and the second travel track data. It is possible to appropriately generate the travelable range data.

Further, at the map data generation device 3, the travelable range data is stored in the travelable range data storage unit with an attribute which can specify the travelable range data is provided. By providing the attribute, it is possible to manage the travelable range data while distinguishing the travelable range data from other data, so that it is possible to expand applications of the travelable range data.

Further, at the map data generation device 3, the travelable range data is generated after crossing travel track data which deviates from a predetermined range is excluded through statistical processing. By excluding exceptional travel track data, it is possible to appropriately generate the travelable range data.

Further, at the map data generation device 3, the travelable range data is generated in a form of polygon data. By generating the travelable range data in a form of polygon data, it is possible to expand applications of the travelable range data.

Further, at the map data generation device 3, the start section and the end section are set using the road shape data. By specifying, for example, the merging section, the branch section, the intersection, the side of entry into the intersection, and the side of entry into the toll booth using the road shape data, it is possible to appropriately set the start section and the end section.

Further, at the map data generation device 3, the travelable range data is distributed to the in-vehicle equipment 2. By distributing the travelable range data to the in-vehicle equipment 2, it is possible to appropriately utilize the travelable range data on the vehicle side.

Further, at the in-vehicle equipment 2, the travelable range data is acquired from the map data generation device 3, whether vehicle behavior within the travelable range can be implemented is determined using a situation around the vehicle, and in a case where it is determined that the vehicle behavior can be implemented, the vehicle behavior is implemented. By implementing the vehicle behavior relating to the automated driving function and the driving assist function in accordance with the situation around the vehicle, it is possible to appropriately implement the automated driving function and the driving assist function.

Further, at the in-vehicle equipment 2, by implementing travel control in accordance with the predicted track indicated by the predicted track data, it is possible to appropriately implement travel control in accordance with the predicted track, and by implementing vehicle control indicated by the vehicle control data, it is possible to appropriately implement vehicle control.

While the present disclosure has been described with reference to the examples, it is understood that the present disclosure is not limited to these examples and structures. The present disclosure incorporates various modified examples and modifications within an equivalent range. In addition, various combinations, forms, and other combinations and forms including only one element or more or less elements fall within the scope and the scope of mind of the present disclosure.

While a merging section, a branch section, an intersection, an entry to an intersection and an entry to a toll booth are described as an example of a section where lanes cross, the present disclosure can be applied to any section where lanes cross, and, for example, the present disclosure can be applied to an entry and an exit at which a plurality of lanes are concentrated inside a parking area, a merging section, a branch section, or the like, which temporarily occur due to construction, occurrence of an accident, or the like.

The control unit and the method described in the present disclosure may be implemented with a dedicated computer including a processor which is programmed to execute one or more functions embodied by a computer program, and a memory. Alternatively, the control unit and the method described in the present disclosure may be implemented with a dedicated computer including a processer constituted with one or more dedicated hardware logic circuits. Alternatively, the control unit and the method described in the present disclosure may be implemented with one or more dedicated computers constituted with combination of a processor which is programmed to execute one or more functions and a memory, and a processor constituted with one or more hardware logic circuits. Further, the computer program may be stored in a computer-readable non-transitory tangible recording medium as an instruction to be executed by the computer.

What is claimed is:

1. A map data generation device for generating map data that includes travelable range data, the travelable range data generated based on a plurality of probe data transmitted from a plurality of vehicles, the travelable range data generated prior to traveling of a subject vehicle, the travelable range data configured to be used to implement an automated driving function or a driving assist function by a subject vehicle, the map data generation device being located external of the plurality of vehicles, the map data generation device comprising:
    a start section setting unit configured to set a start section in a first lane, the start section is a section of the first lane in which travel across the lane from the first lane to a second lane begins;
    an end section setting unit configured to set an end section in the second lane, the end section is a section in which travel across the lane from the first lane to the second lane ends;
    a first storage control unit configured to cause crossing travel track data from the start section to the end section to be stored in a crossing travel track data storage unit of a map data storage unit, the crossing travel track data comprising possible travel paths between the start section and the end section;
    a travelable range data generating unit configured to generate the travelable range data indicating a travelable range of travel from the first lane to the second lane using the crossing travel track data to implement an automated driving function or a driving assist function, the travelable range is defined by the possible travel paths between the start section and the end section within the crossing travel track data, the travelable range data comprising part of the map data; and
a second storage control unit configured to cause the travelable range data to be stored in a travelable range data storage unit of the map data storage unit,
wherein
the map data is generated external to the plurality of vehicles, and
the automated driving function or the driving assist function is implemented on the subject vehicle using the travelable range data.

2. The map data generation device according to claim 1, further comprising:
a first travel track data specifying unit configured to specify crossing travel track data that is closest to the endpoint on one side of the start section and away from the start section as a first travel track data; and
a second travel track data specifying unit configured to specify crossing travel track data that is closest to the endpoint on another side of the start section and away from the start section as a second travel track data,
wherein
the travelable range data generating unit generates the travelable range data using the first travel track data and the second travel track data.

3. The map data generation device according to claim 1, wherein
the second storage control unit causes the travelable range data to be stored in the travelable range data storage unit with an attribute which makes the travelable range data identifiable is provided.

4. The map data generation device according to claim 1, wherein
the travelable range data generating unit generates travelable range data after excluding crossing travel track data which deviates from a predetermined range by performing statistical processing on the crossing travel track data.

5. The map data generation device according to claim 1, wherein
the travelable range data generating unit generates the travelable range data in a form of polygon data.

6. The map data generation device according to claim 1, further comprising:
a road shape data storage unit configured to store road shape data indicating a road shape, wherein
the start section setting unit sets the start section using the road shape data, and
the end section setting unit sets the end section using the road shape data.

7. The map data generation device according to claim 1, further comprising:
a distribution control unit configured to distribute the travelable range data to in-vehicle equipment.

8. A map data generation system for generating map data that includes travelable range data, the travelable range data generated based on a plurality of probe data transmitted from a plurality of vehicles, the travelable range data generated prior to traveling of a subject vehicle, the travelable range data configured to be used to implement an automated driving function or a driving assist function by a subject vehicle, the map data generation system comprising:
a map data generation device located external of the plurality of vehicles, the map data generation device comprising:
a start section setting unit configured to set a start section in a first lane, the start section is a section of the first lane in which travel across the lane from the first lane to a second lane begins;
an end section setting unit configured to set an end section in the second lane, the end section is a section in which travel across the lane from the first lane to the second lane ends;
a first storage control unit configured to cause crossing travel track data from the start section to the end section to be stored in a crossing travel track data storage unit of a map data storage unit, the crossing travel track data comprising possible travel paths between the start section and the end section;
a travelable range data generating unit configured to generate the travelable range data indicating a travelable range of travel from the first lane to the second lane using the crossing travel track data to implement an automated driving function or a driving assist function, the travelable range is defined by the possible travel paths between the start section and the end section within the crossing travel track data, the travelable range data comprising part of the map data; and
a second storage control unit configured to cause the travelable range data to be stored in a travelable range data storage unit of the map data storage unit; and
in-vehicle equipment configured to communicate with the map data generation device, the in-vehicle equipment comprising:
a travelable range data acquiring unit configured to acquire the travelable range data the map data generation device;
a vehicle behavior data generating unit configured to generate vehicle behavior data indicating vehicle behavior relating to the automated driving function and the driving assist function within the travelable range;
a peripheral situation acquiring unit configured to acquire a situation in an environment of the vehicle;
an implementation determining unit configured to determine whether it is possible to implement the vehicle behavior indicated by the vehicle behavior data using the situation around the vehicle; and
a vehicle behavior implementing unit configured to implement the vehicle behavior in a case where it is determined that it is possible to implement the vehicle behavior,
wherein
the map data is generated external to the plurality of vehicles.

9. The map data generation system according to claim 8, wherein
the vehicle behavior data generating unit generates predicted track data indicating a predicted track in the travelable range as the vehicle behavior data, and
the vehicle behavior implementing unit implements travel control in accordance with the predicted track indicated by the predicted track data.

10. The map data generation system according to claim 8, wherein
the vehicle behavior data generating unit generates vehicle control data indicating vehicle control in the travelable range as the vehicle behavior data, and
the vehicle behavior implementing unit implements the vehicle control indicated by the vehicle control data.

11. A map data generation method for generating map data that includes travelable range data, the travelable range data generated based on a plurality of probe data transmitted from a plurality of vehicles, the travelable range data generated prior to traveling of a subject vehicle, the travelable range data configured to be used to implement an automated driving function or a driving assist function by a subject vehicle, the map data generation method comprising:
    setting a start section in a first lane, the start section is a section of the first lane in which travel across the lane from the first lane to a second lane begins;
    setting an end section in a second lane, the end section is the section in which travel across the lane from the first lane to the second lane ends;
    causing crossing travel track data from the start section to the end section to be stored in a crossing travel track data storage unit of a map data storage unit, the crossing travel track data comprising possible travel paths between the start section and the end section;
    generating travelable range data indicating a travelable range of travel from the first lane to the second lane using the crossing travel track data to implement an automated driving function or a driving assist function, the travelable range is defined by the possible travel paths between the start section and the end section within the crossing travel track data; and
    causing the travelable range data to be stored in a travelable range data storage unit of the map data storage unit,
wherein
the map data is generated external to the plurality of vehicles, and
the automated driving function or the driving assist function is implemented on the subject vehicle using the travelable range data.

\* \* \* \* \*